United States Patent [19]

Charkey et al.

[11] Patent Number: 4,546,058

[45] Date of Patent: Oct. 8, 1985

[54] NICKEL ELECTRODE FOR ALKALINE BATTERIES

[75] Inventors: Allen Charkey, Brookfield, Conn.; Stanley Januszkiewicz, South Hadley, Mass.

[73] Assignee: Energy Research Corporation, Danbury, Conn.

[21] Appl. No.: 680,975

[22] Filed: Dec. 12, 1984

[51] Int. Cl.$^4$ .............................................. H01M 4/32
[52] U.S. Cl. .................................... 429/223; 252/502
[58] Field of Search ................ 429/223; 252/518, 519, 252/502, 506

[56] References Cited

U.S. PATENT DOCUMENTS

| | | | |
|---|---|---|---|
| 3,415,689 | 12/1968 | Carson et al. | 136/120 |
| 3,528,857 | 9/1970 | Lieb et al. | 136/86 |
| 3,607,416 | 9/1971 | Sheer et al. | 136/86 |
| 3,684,578 | 8/1972 | Makishima et al. | 136/86 F |
| 3,706,644 | 12/1972 | Martinsons | 204/98 |
| 3,711,382 | 1/1973 | Anthony | 204/1 R |
| 3,977,958 | 8/1976 | Caldwell et al. | 204/252 |
| 4,132,619 | 1/1979 | Klein et al. | 204/242 |
| 4,142,005 | 2/1979 | Caldwell et al. | 427/126 |
| 4,243,497 | 1/1981 | Nicolas et al. | 204/98 |
| 4,411,761 | 10/1983 | Roos et al. | 204/290 R |
| 4,428,805 | 1/1984 | Caldwell et al. | 204/129 |

Primary Examiner—Charles F. LeFevour

[57] ABSTRACT

A nickel electrode including a conductive support and a layer on the support including a mixture of a nickel active material and a graphite diluent containing a spinel type oxide, the spinel type oxide having the formula $M_2Co_2O_4$, where $M_2$ is Co, Ni, Mn, Fe, Cu, Zn or Cd, or combinations thereof, and having a weight which is in the range of 1–30 percent of the weight of the diluent.

7 Claims, 2 Drawing Figures

NICKEL ELECTRODE FOR ALKALINE BATTERIES

BACKGROUND OF THE INVENTION

This invention relates to electrodes for use in alkaline storage batteries and more particularly to electrodes which contain nickel active material and which additionally contain graphite as a conductive diluent to impart electronic conductivity to the active material.

Nickel electrodes of this type usually employ Ni(OH)$_2$ as the active material and are commonly employed in alkaline batteries containing Cd, Zn, H$_2$, etc. as the counter electrode or anode. The conductive graphite diluent in these electrodes takes the place of the more conventional sintered nickel plaque structures and results in a lighter weight and less costly battery system.

One of the major drawbacks to the wide spread use of this electrode is the occurrence of graphite oxidation which appears during long-term cycling, particularly, during charge, since oxygen is evolved on overcharge. Graphite oxidation results in loss of conductivity of the nickel electrode which manifests itself as electrode swelling, increased polarization, lower utilization of the Ni(OH)$_2$ active material and reduced cycle life. Oxidation of graphite in alkaline electrolyte also results in increased K$_2$CO$_3$ concentration, since CO$_2$ which is the product of oxidation reaction further reacts with KOH to form K$_2$CO$_3$. In Ni-Cd alkaline cells, high carbonate concentrations increase the solubility of Cd(OH)$_2$ resulting in cadmium shorting during cycling which, in turn, reduces cycle life.

Attempts at eliminating or greatly reducing graphite oxidation have included use of coarser graphite particles, chemical or heat treatment of the graphite and combinations of these procedures. All have resulted in little or no improvement in the rate of graphite corrosion.

Still other techniques include the use of mixtures of coarse and fine graphite powders containing metallic powder (e.g. Ni, Mn, Ag, etc.) additions. The addition of metallic elements with low oxygen overvoltages tends to improve somewhat the graphite stability, but these elements are also oxidized with time and decrease the coulombic efficiency of the nickel electrode.

It is, therefore, an object of the present invention to provide a nickel electrode containing a graphite diluent which exhibits longer life.

It is a further object of the present invention to provide a nickel electrode containing a graphite diluent which exhibits decreased oxidation of the diluent.

It is yet a further object of the present invention to provide a nickel electrode containing a graphite diluent in an amount heretofore not achievable.

SUMMARY OF THE INVENTION

In accordance with the principles of the present invention, the above and other objectives are realized in an electrode comprising a conductive support and a layer on the support including a mixture of a nickel active material and a conductive graphite diluent containing a spinel type oxide, the spinel type oxide having the general formula M$_2$Co$_2$O$_4$, where M$_2$ is Co, Ni, Mn, Fe, Cu, Zn or Cd, or combinations thereof, and having a weight which is in the range of 1-30 percent of the weight of the diluent. A more preferable range for the weight of the spinel is from 5 to 25 percent of the weight of the diluent.

Alkaline secondary batteries employing nickel electrodes in accordance with the above are found to exhibit a deep discharge-recharge cycling capacity in excess of 750 cycles. It is believed that the spinel additive employed in the present electrodes greatly improves the oxidation resistance of the graphite by providing sites for oxygen evolution to occur during charge. These active sites are located on the spinel oxide and oxygen evolution on this surface occurs at a lower overvoltage than on graphite. Improvements in cell voltage are also realized since the conductivity of the graphite is also preserved during cycling by this treatment. Companion cells identical in construction but without the spinel oxide addition begin to show loss of capacity after 500 deep discharge cycles.

BRIEF DESCRIPTION OF THE DRAWINGS

The above and other features and aspects of the present invention will become more apparent upon reading the following detailed description in conjunction with the attached drawings, in which.

DETAILED DESCRIPTION

Figure 1:
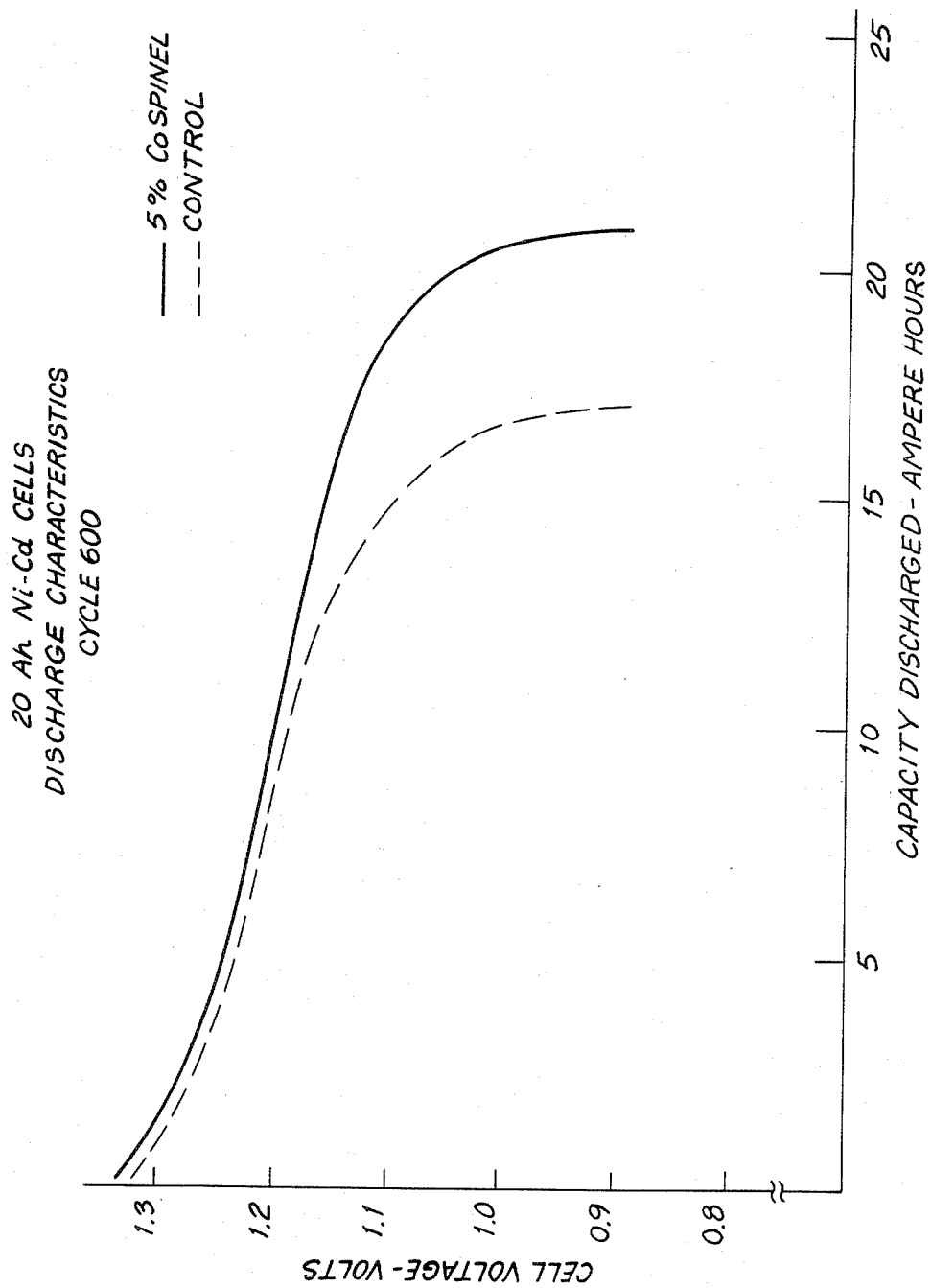
FIG. 1 shows representative discharge curves after 600 cycles of a nickel-cadmium alkaline secondary cell having a positive nickel electrode in accordance with the principles of the present invention and of a like control cell having a positive nickel electrode of a conventional type.

As above-indicated, the present invention contemplates a nickel electrode comprising a conductive support and a layer comprised of a mixture of an active material and a graphite conductive diluent including a spinel type oxide. The conductive support can preferably be a nickel foil, although other support materials such as, for example, nickel plated copper or steel may be used. The graphite conductive diluent preferably is KS-44 manufactured by Lonza Corp.

A preferable spinel type oxide is a cobalt cobalt spinel having the formula CoCo$_2$O$_4$. Other cobalt spinel type oxides having the formulas M$_2$Co$_2$O$_4$ can also be employed. Typical materials for M$_2$ are Ni, Mn, Fe, Cu, Zn and Cd. Mixtures of these spinels can also be used. A preferable range for the total spinel contribution to the electrode is from 1-30 percent of the weight of the diluent. A more preferable range is 5 to 25 percent of the weight of the diluent.

The nickel active material is preferably Ni(OH)$_2$. Other usable active materials are mixtures of Ni(OH)$_2$ and Co(OH)$_2$, and MnO$_2$.

It is also preferable that a binder be used for the layer. A preferred binder is polytetrafluoroethylene. Other possible binders which may be employed are polyethylene, and neoprene latex.

In a particularly preferred embodiment of the invention nickel electrodes are prepared using a nickel foil substrate and a layer containing Ni(OH)$_2$ active material including a small percentage of Co(OH)$_2$, a cobalt cobalt spinel coated graphite powder and a binder such as polytetrafluoroethylene (PTFE). The layer is formed by first mixing the latter materials and the resulting mixture is kneaded to a dough-like consistency with the assistance of a non-aqueous lubricant. The kneaded mixture is then rolled to form sheets or layers which are then laminated onto the foil to produce finished electrodes having a thickness in the range of 20 to 100 mils and preferably of 40 to 80 mils.

The cobalt cobalt spinel coated graphite powder is obtained by controlled thermal decomposition of Co($NO_3$)$_2$ salt or by precipitation of Co(OH)$_2$ on the graphite followed by controlled thermal decomposition. The foregoing practice may be better understood by way of the following example.

EXAMPLE

Graphite powder containing cobalt spinel oxide was prepared by suspending 190 grams of graphite powder in 300 ml of distilled water. Next, 36.2 of Co($NO_3$)$_2$.6-$H_2O$ was dissolved in 100 ml of water and added to the graphite suspension. Approximately 200 ml of 38 percent $NH_4OH$ was then added until the pH of the solution was 11 at which point Co(OH)$_2$ was precipitated from the solution onto the surface of the graphite powder suspension. During this time the solution was constantly stirred by mechanical agitation. The residual water in the solution was then evaporated at 100° F. and the powder was then heated in an air convected oven at 250° C. for 2 hours. The resultant powder contained 5 percent by weight cobalt spinel which was identified by X-ray diffraction analysis to correspond to the formula $CoCo_2O_4$.

The graphite containing 5 percent cobalt spinel was then used as the conductive diluent in the formation of nickel electrodes for alkaline cells. Nickel active material containing 66 percent Ni(OH)$_2$+30 percent spinel treated graphite and 4 percent PTFE was fabricated into positive electrodes for 20 ampere-hour capacity nickel-cadmium cells. The mixture of active material, spinel and PTFE was first kneaded with the aid of a non-aqueous libricant to a dough-like consistency. The dough was then rolled into strips and laminated with a perforated 0.002" thick nickel foil support having an open area of about 35 percent. Positive electrodes of about 0.080" in thickness were thus formed. The total mass of positive material was 138 grams.

Negative electrodes having a total mass of negative active material (cadmium oxide) of 140 grams were then also formed in conventional manner. The positive and negative electrodes were then arranged in a suitable cell with an aqueous electrolyte having 35 percent potassium hydroxide and containing 1 percent by weight lithium hydroxide. The positive and negative electrodes were separated by one layer of non-woven polyamide Pellon 0.005" thick (Pellon Corporation) and one layer of microporous polypylene film Celgard K-306 (Celenese Corporation).

In the foregoing practice, the Ni(OH)$_2$ may be a chemically or electrochemically precipitated powder obtained from $NiSO_4$, Ni($NO_3$)$_2$ or $NiCl_2$ salts. The graphite may be a commercially available synthetic graphite powder designated KS-44 from Lonza having an average particle size of 40 microns. The PTFE may be a powder commercially available as DuPont Teflon powder No. 6C. A suitable solvent is also commercially available as Shell Sol B, a petroleum solvent having an aniline point of 129° F. and a composition by volume of 65.5 percent paraffins, 32 percent napthene and 2.5 percent aromatics.

The cadmium active material may be a commercially available cadmium oxide powder known as ASARCO Globe Brand CdO.

The cell described in the above example was subjected to repetitive discharge-recharge cycling wherein it was discharged at 10 amperes for 2 hours to remove 20 ampere-hours of the cell capacity and was then recharged at 3.7 amperes for 6 hours which restored 22.2 ampere-hours. Approximately a 10 percent overcharge is required to restore 100 percent of the nickel electrode capacity since its charging reaction occurs with the simultaneous evolution of oxygen during the latter portion of the charge. Every 50 cycles the cell was given a capacity discharge of 10 amperes to a voltage cut-off of 0.9 volts.

FIG. 1 shows in solid line a representative discharge curve after 600 cycles for the cell constructed in accordance with the above procedure.

Figure 2:
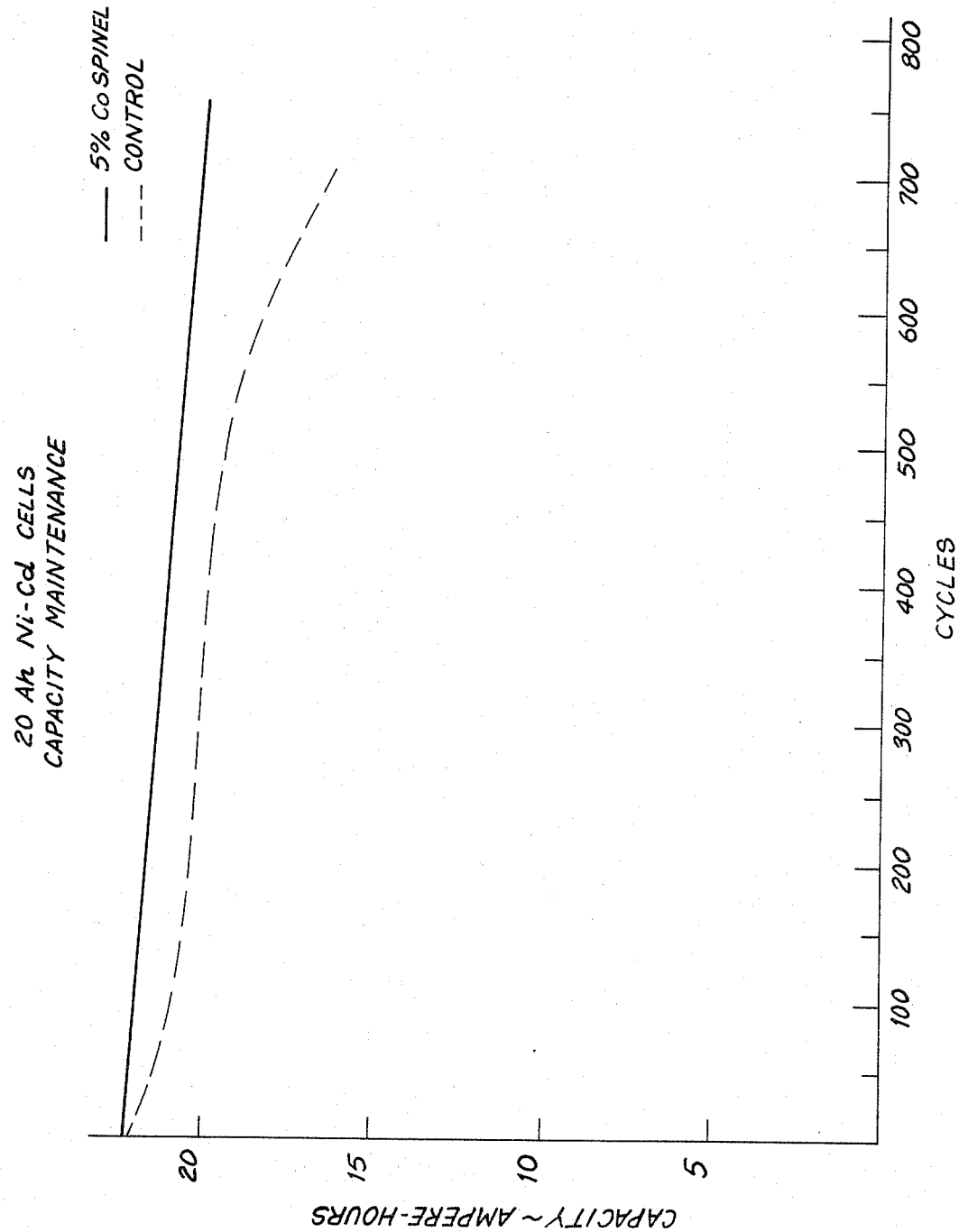
FIG. 2 shows curves indicative of the ampere-hour capacities of the cells of FIG. 1.

FIG. 2, in turn, shows in solid line the capacity maintenance of the above-described cell in the course of cycling in excess of 750 cycles. As can be seen, the cell exhibits only a small capacity decline being from about 22 ampere-hours at cycle 1 to about 20 ampere-hours at cycle 750.

To provide a basis for evaluating the performance of the above-described cell, FIGS. 1 and 2 further show, in broken line, curves illustrating the discharge and cyclic performance of a comparison or control cell differing from the cell of the invention solely in respect of its positive electrode composition. The comparison cell positive electrode was prepared from a mixture containing 66 percent Ni(OH)$_2$, 30 percent untreated graphite and 4 percent PTFE. The initial ampere-hour capacity of the control cell was similar to the spinel-additive cell of the invention and the control cell was subjected to discharge-recharge cycling as previously described.

As seen from FIG. 1, the discharge capacity of the comparison cell after 600 cycles was about 18 ampere-hours whereas the cell of the invention containing the spinel additive was about 21 ampere-hours. Looking at FIG. 2, the comparison cell deteriorated continuously after 500 cycles and at cycle 700 the capacity had declined to about 16 ampere-hours.

The inability of the comparison cell to maintain its rated ampere-hour output on repetitive cycling after 500 cycles is attributable to oxidation of some of the unprotected graphite. The oxidation of graphite results in increased $K_2CO_3$ concentration in the cell, and reduction in the electrical conductivity of the positive electrode. Both of these conditions result in reduced capacity during cycling. In the spinel-additive cell constructed in accordance with the invention, the spinel is believed to protect the graphite from oxidation either by coating the graphite or by providing active sites upon which oxygen evolution may preferentially occur during charge because of its lower oxygen overvoltage. The long-term beneficial effects of the cobalt spinel additive are further evidenced by the results, particularly those shown in FIG. 2, which illustrates the stability of the capacity, indicating that the spinel additive is extremely stable in the KOH electrolyte under oxidative conditions.

It should be noted that the spinels used in the invention may be prepared by methods other than discussed above. For example, direct thermal decomposition of metallic salts or firing of the simple oxide constituents are two other ways of forming the spinels.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A nickel electrode comprising:
   an electrically conductive support;
   a layer on said support, said layer comprising a mixture of a nickel active material and a conductive graphite diluent containing a spinel, type oxide, said spinel type oxide having the general formula $M_2Co_2O_4$, where $M_2$ is Co, Ni, Mn, Fe, Cu, Zn or Cd, or combinations thereof, said spinel type oxide having a weight which is in the range of 1-30 percent of the weight of said diluent.

2. An electrode in accordance with claim 1 wherein: said spinel oxide is $CoCo_2O_4$.

3. An electrode in accordance with claim 2 wherein: said nickel active material is nickel hydroxide.

4. An electrode in accordance with claim 3 further including:
   a binder included in said layer.

5. An electrode in accordance with claim 4 wherein: said binder comprises polytetrafluoroethylene.

6. An electrode in accordance with claim 1 wherein: said spinel oxide is $NiCo_2O_4$.

7. An electrode in accordance with claim 1 wherein: said spinel oxide is $MnCo_2O_4$.

* * * * *